Oct. 16, 1956 G. E. HENNING 2,766,480
METHODS OF AND APPARATUS FOR EXTRUDING CELLULAR PLASTICS
Filed Aug. 28, 1952

INVENTOR
G. E. HENNING
BY
ATTORNEY

Oct. 16, 1956 G. E. HENNING 2,766,480
METHODS OF AND APPARATUS FOR EXTRUDING CELLULAR PLASTICS
Filed Aug. 28, 1952 2 Sheets-Sheet 2

INVENTOR
G. E. HENNING
BY
ATTORNEY

United States Patent Office 2,766,480
Patented Oct. 16, 1956

2,766,480

METHODS OF AND APPARATUS FOR EXTRUDING CELLULAR PLASTICS

George E. Henning, Baltimore, Md., assignor to Western Electric Company, Incorporated, New York, N. Y., a corporation of New York Application August 28, 1952, Serial No. 306,822

12 Claims. (Cl. 18—13)

This invention relates to methods of and apparatus for extruding plastics, and more particularly to methods of and apparatus for extruding coverings of cellular plastics upon filamentary conductors.

The extruders used commercially to form insulating plastic coverings upon filamentary conductive cores are of the cross-head type. Such extruders include a stock screw rotatably mounted within a cylindrical bore for forcing a plastic compound from an entrance end of the bore to a delivery end thereof, and means for advancing a filamentary conductor through a head mounted at the delivery end of the bore. The head is provided with an extrusion die mounted in axial alignment with and spaced from a core tube for guiding the advancing conductor into and through the die.

Extruders of the cross-head type inherently present the problem of compensating for unbalanced flow conditions caused by the 90° bend in the flow of the plastic compound. This unbalanced flow frequently causes a lack of concentricity between the sheath and the core of the extruded product. The obvious result of a lack of concentricity is a variation in the wall thickness of the insulation on the conductor. Since rigid specifications established for the communications industry require the physical and electrical characteristics at all points along an insulated conductor to be uniform within narrow limits of tolerance, the concentricity of the insulated conductor must be closely controlled.

The existence of unbalanced flow conditions within an extruder creates even greater problems when the plastic insulation extruded onto the conductor is cellular in nature. In the manufacture of conductors insulated by a cellular form of a plastic, such as cellular polyethylene, solid polymers of ethylene mixed with a heat decomposable blowing agent may be continuously extruded onto a conductor moving through an extrusion die. The extrusion temperature should be so controlled that as the tubular sheath of polyethylene issues from the die, the gas evolved by heat-decomposition of the blowing agent expands the sheath into a cellular form containing a multiplicity of minute, blown cells unformly distributed throughout the sheath.

In order to prevent premature gas expansion within the confines of the extruder, it is important that temperatures within the extruder and the die should be accurately regulated and that the rate of extrusion and the linear speed of the conductive core be adjusted suitably. Furthermore, some blowing agents decompose within a rather narrow temperature range, and their decomposition temperature may be affected by the presence of other ingredients in the plastic compound. Under such circumstances, it is necessary to seek suitable means for rendering the extrusion of expanded plastics less critical with respect to temperature and ingredients. This may be accomplished by creating a back pressure within the extruder to prevent premature expansion of gas therein.

An object of the invention is to provide new and improved methods of and apparatus for extruding plastics.

Another object of the invention is to provide new and improved methods of and apparatus for extruding coverings of cellular plastics upon filamentary conductors.

A method illustrating certain features of the invention may include advancing such a conductor axially through an extrusion die, forcing a mixture of a plastic compound and an expanding agent towards the die under conditions tending to cause the agent to expand the mixture into a cellular form, directing the mixture radially towards the advancing conductor circumferentially thereof just before the conductor reaches the die, and creating a high back pressure in the flowing mixture to prevent premature expansion thereof before it emerges from the die.

An apparatus illustrating certain features of the invention may include an extrusion head having a passageway extending therethrough, an extrusion die mounted at one end of the passageway, a plug mounted in the passageway adjacent to the die for restricting the flow of plastic compound to create a back pressure within the passageway, and means for forcing such a plastic compound through the passageway and the die.

A clear understanding of the invention may be obtained from the following detailed description in conjunction with the accompanying drawings, in which.

Figure 1:
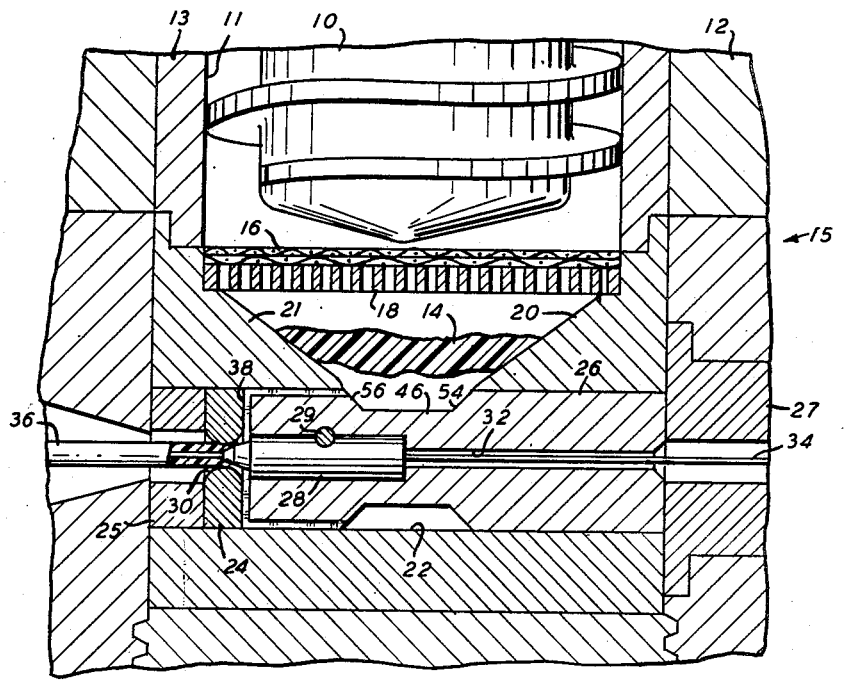
Fig. 1 is a fragmentary, horizontal section of apparatus forming one embodiment of the invention designed to be utilized in performing methods embodying the invention.

Referring now in detail to the drawings, the extruder illustrated in Fig. 1 is of the cross-head type. It includes a stock screw 10 disposed longitudinally for rotation within a cylindrical bore 11 of an extrusion cylinder 12 having a liner 13. Means (not shown) is provided for positively rotating the stock screw to knead and advance a mass 14 of a plastic compound toward a delivery end of the extrusion bore 11, where an extrusion head 15 is secured. The plastic compound fed into the bore 11 may be a mixture of granular polyethylene and a heat decomposable blowing agent, such as dinitroso pentamethylene tetramine.

Mounted transversely across the delivery end of the extrusion bore 11 is a straining screen 16 supported upon a backing plate 18. After passing through the straining screen 16 and the backing plate 18, the mass 14 of the plastic compound enters a tapered passageway 20 formed in a cylindrical, centrally apertured block 21. The passageway 20 diminishes gradually in cross-section as it leads from the extrusion bore 11 to a chamber 22 formed internally of the block 21. At the left-hand end of the chamber 22, as seen in Fig. 1, an extrusion die 24 abuts a spacer 25 secured within the extrusion head 15. The right-hand end of the chamber 22 is occupied by a core tube holder 26 secured within the extrusion head 15 by means of a bushing 27.

A core tube 28 is held in position within the core tube holder 26 by means of a pin 29. The core tube 28 is mounted in axial alignment with a central orifice 30 extending through the die 24. An axial passageway 31 (Fig. 2) extending through the core tube 28 is aligned with an axial passageway 32 (Fig. 1) extending through the core tube holder 26 so that a filamentary conductive core 34, such as a copper-clad steel wire, may be advanced continuously through these passageways from right to left as viewed in Fig. 1. The bushing 27 functions as a wire guide at the entrance to the apparatus, and the core tube 28 guides the continuously advancing core 34 so that it will pass through the axial center of the orifice 30 in the die 24. By means of the die 24 the mass 14 of plastic compound is formed into a tubular sheath surrounding the core 34, resulting in an insulated conductor 36. Beyond the die 24 the insulated conductor 36 is advanced through means (not shown) for cooling the insulating sheath, and thence about a capstan (not shown) which provides the pulling force to advance the core 34 through the apparatus.

The core tube holder 26 completely occupies the right-hand end of the chamber 22. In the left-hand end of the chamber 22 the core tube holder 26 is provided with a transversely flat face 38 which abuts the die 24. This end of the core tube holder is provided with a cylindrical plug 40 having a plurality of longitudinal grooves 42—42 spaced equally about its periphery. The longitudinal grooves 42—42 lead to a plurality of radial grooves 44—44 formed in the end face 38 of the core tube holder. Intermediate its ends the core tube holder 26 is reduced in size circumferentially thereof, thereby forming a cylindrical reduced portion 46 in the zone adjacent to the exit end of the tapered passageway 20. Thus, the unoccupied portion of the chamber 22 resembles a hollow annulus positioned at the exit end of the tapered passageway 20. The cylindrical plug 40 occupies all of the portion of the chamber 22 adjacent to the die 24, except for the relief provided by the longitudinal grooves 42—42 and the radial grooves 44—44.

The mass 14 of the plastic compound is advanced by the stock screw 10 through the tapered passageway 20 into the remaining annular portion of the chamber 22, the flow of the compound is then split into a plurality of small streams which flow through the longitudinal grooves 42—42, and thence through the radial grooves 44—44. The core tube 28 protrudes from the core tube holder 26 in the center of the radial grooves 44—44. The mass of plastic compound flowing through the radial grooves 44—44 converges upon the protruding core tube 28 and becomes formed into a unitary conical stream as the compound enters the orifice 30 in the die 24.

It is to be observed that the protruding portion of the core tube 28 is composed of two distinct frustoconical sections. A large frustoconical section 48 forms the base of the protruding portion of the core tube, and lies next to the transversely flat face 38. It may be said to have been cut from a cone having an apex angle of about 30°. A smaller frustoconical section 50 forms the tip of the protruding portion of the core tube, and this section may be described as cut from a cone having an apex angle of about 60°. The tip section 50 terminates in a transversely flat face 52, in the center of which the axial passageway 31 appears. The core tube 28 protrudes into the die 24, so that the frustoconical tip section 50 is fully within the orifice 30 of the die. The clearance at this point should be about .010 inch to about .015 inch.

On both sides of its cylindrical reduced portion 46 the core tube holder 26 is chamfered, forming a conical portion 54, which closes one end of the unoccupied portion of the chamber 22, and a conical portion 56 positioned on the other side of the chamber 22. When it reaches the core tube holder 26, the mass 14 of the plastic compound flows around the cylindrical reduced portion 46, over the conical portion 56 and enters the longitudinal grooves 42—42.

A considerable back pressure is built up within the extrusion head 15 by blocking the exit end of the chamber 22 by means of the cylindrical plug 40, so that all of the advancing plastic compound must flow through the grooves 42—42 and 44—44 therein to escape from this chamber. The walls of the grooves 42—42 and of the grooves 44—44 present frictional resistance to the passage of the plastic compound being forced around the cylindrical plug 40 through these grooves. The back pressure built up in this manner contributes greatly to the successful extrusion of the compound. The grooves may be square in cross-section or the grooves may assume other configurations. For example, they may be semi-circular or V-shaped in cross-section.

In the extrusion of a sheath of cellular polyethylene upon a filamentary conductive core, a blowing agent, such as a powdered form of dinitroso pentamethylene tetramine, may be uniformly distributed upon granules of the commercially available polymers of ethylene which are to be extruded. At the die a temperature of about 385° F. to about 450° F. is maintained to facilitate continuous extrusion of the polymer and to insure the formation of gas by decomposition of the blowing agent. A convenient length of the moving core may be preheated prior to its entry into the extruder, in order to prevent the conductive core from chilling the extruded mass and thereby inhibiting the action of the blowing agent. The extruded layer of insulation expands after leaving the extrusion die, due to the decomposition of the blowing agent, which forms minute, uniformly distributed, discrete, gas filled cells throughout the polyethylene sheath. The extruded product formed in this manner is characterized by uniformity in size, composition and electrical properties.

The back pressure built up within the extrusion head controls the expansion of the plastic compound that is caused by heat-decomposition of the blowing agent therein. Dinitroso pentamethylene tetramine, the preferred blowing agent, decomposes within a narrow temperature range near 400° F. This decomposition temperature is sufficiently far above the temperature at which the polyethylene softens to make it possible to use this blowing agent without danger of premature decomposition under ordinary operating conditions. However, the presence of other ingredients, such as certain pigments in the plastic compound may cause this blowing agent to decompose at slightly different temperatures. In order to insure against premature expansion of the blowing agent within the extruder, a high back pressure is built up in the flowing plastic prior to the instant the plastic flows onto the advancing filamentary core being sheathed. This is accomplished by providing flow-restricting grooves, such as the grooves 42—42 and 44—44, in the cylindrical plug 40 formed on the left-hand end of the core tube holder 26.

As a rule, the stock screw may be any one of three standard sizes, in which the screw may have a diameter of 2 inches, 3¼ inches or 4½ inches. The pitch of the threads on the stock screw may be relatively long so as to cause the plastic compound to be advanced rapidly through the extrusion bore, or the threads may have a shorter pitch which advances the plastic compound less rapidly, but kneads the compound and builds up a high pressure therein. It is evident that the rate of delivery of the extruded product as well as the degree of throttling required of the grooved plug on the core tube holder, are integrally related to the type of stock screw selected. From about 20 up to about 60 pounds per hour of cellular polyethylene may be delivered by extruders having such stock screws.

The rate at which a filamentary core may be advanced through an extruder is determined largely by the wall thickness of the sheath of insulation extruded thereon. Using filamentary cores having diameters ranging from about .016 inch up to about .051 inch to produce cellular polyethylene insulated conductors having outside diameters ranging from about .031 inch up to about .300 inch, the cores may be advanced through the extruders at speeds ranging from about 50 feet per minute to about 1,000 feet per minute. Using a stock screw having a diameter of about 3¼ inches to extrude a polyethylene compound onto a filamentary core having a diameter falling within this range, and being advanced through a die orifice having a minimum diameter ranging from about .019 inch up to about .093 inch, a pressure head of as much as 6,000 pounds per square inch may be built up behind the cylindrical plug 40 on the left-hand end of the core tube holder. This high pressure head makes it possible for the plastic compound within the extruder to be heated to a temperature appreciably above the temperature at which the blowing agent would ordinarily decompose, without evolving any gas prior to the time the plastic compound flows past the tip of the core tube 28.

The pressure head will be high in the extrusion bore 11, in the chamber 22, and in the tapered passageway 20 which leads from the extrusion bore to this chamber. Then the static pressure will fall as the plastic compound is forced at higher velocity through the limited passageways provided by the grooves 42—42 and 44—44. A second zone of high pressure, but of much lower pressure than that in the first high pressure zone, may be created within the bell-mouthed entrance of the aperture 30 in the die 24 as the plastic compound flows into this entrance from the small radial grooves. The pressure in the flowing compound remains relatively high until the sheathed core emerges from the exit end of the die, whereupon the sheath may expand rapidly due to release of the pressure confining the gas evolved by decomposition of the blowing agent, and allow the sheath to expand into a cellular form producing the resultant insulated conductor 36.

The small grooves 42—42 and 44—44 provided on the cylindrical plug 40 cause the flowing plastic compound to break up into a plurality of thin streams of equal size uniformly distributed circumferentially of the advancing filamentary core 34. These thin streams converge radially into a single conical stream at the core tube 28, impinge upon the advancing core, and are shaped by the die into a unitary tubular sheath covering the core. The result of this arrangement is that the sheath is expanded uniformly into its cellular form, the cells in all portions of the expanded sheath being of approximately equal size.

If the flow of the plastic compound were not retarded to build up a high back pressure by this arrangement of the die 24 and the grooved plug 40 on the core tube holder 26, and if the flow of the plastic compound were not divided into a plurality of thin streams equally spaced circumferentially of the advancing core 34, the expansion of the extruded sheath might occur unevenly, with blown cells of a distinctly large size appearing in some portions of the sheath. According to the invention, the blowing agent should decompose within the confines of the extruder, but the high pressure head will prevent the evolved gas from expanding, by forcing the released gas to dissolve in and permeate the plastic compound without creating cells therein until after the pressure has fallen, which condition cannot occur until after the plastic compound has issued from the die.

Figure 3:
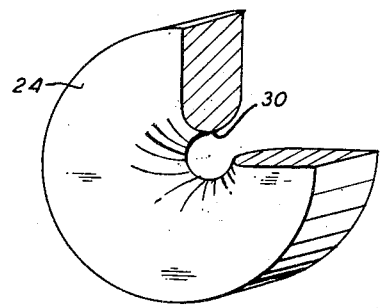
Fig. 3 is a perspective view, partially in section, of a die forming a portion of the apparatus shown in Fig. 1.

The particular shape of the die is believed to contribute materially toward obtaining the improved results observed from the use of this apparatus, particularly when a high percentage of occluded gas is desired in the product. As shown clearly in Fig. 3, the die 24 is generally cylindrical in shape with identical bell-mouthed entrance and exit portions on opposite sides of its central orifice 30. It may be said that the center of the die resembles the central portion of a torus or ring, while the surrounding outer section of the die resembles a disc. The orifice 30 is bounded by a wall perfectly semicircular in cross-section.

This die is very short in comparison with the length of conventional extrusion dies. In one working embodiment of the invention, the die had a length of ¼ inch, and these semicircular sections had a radius of ⅛ inch. In this same instance, the cylindrical plug 40 had a length of about ½ inch, and it had eight longitudinal grooves semicircular in cross-section, each having a radius of about ³⁄₆₄ inch. In most cases, the use of a larger number of grooves each having a smaller size may be even more desirable.

The advancing plastic compound flows smoothly into the bell-mouthed entrance portion of the aperture 30, and on emerging from the bell-mouthed exit portion of this aperture the confinement provided the die gradually tapers away, so that the extruded sheath may expand uniformly without passing across any sharp edges as it does so.

*1st modification*

Figure 4:
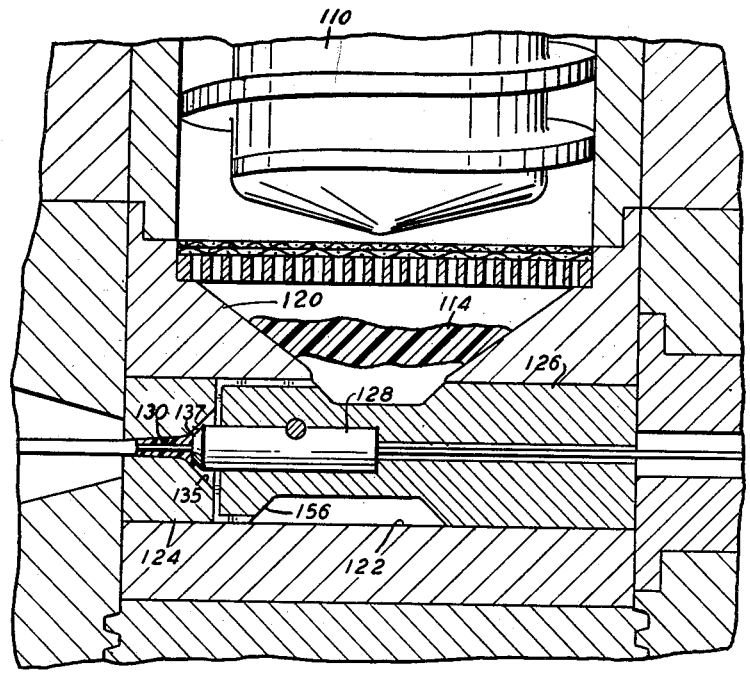
Fig. 4 is a fragmentary, vertical section of a modification of the apparatus shown in Figs. 1 and 2.
Figure 5:
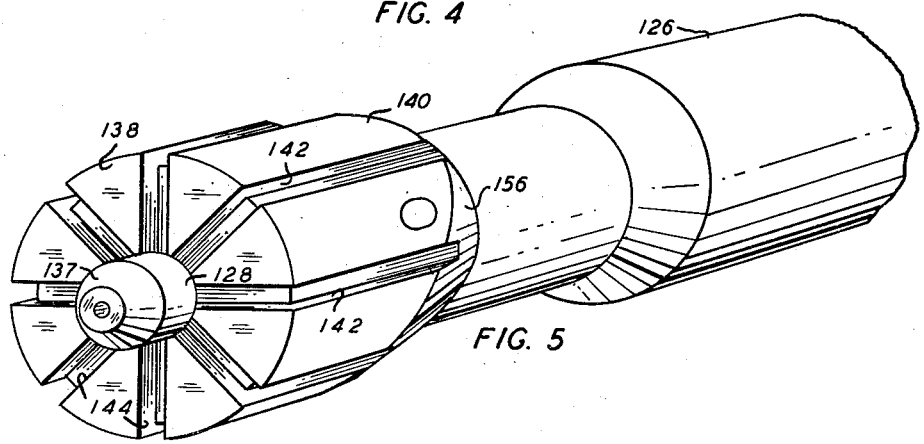
Fig. 5 is an enlarged perspective view of a portion of the modification shown in Fig. 4.

Figs. 4 and 5 illustrate a modification of the invention in which compensation is provided for the bend of 90° through an extruder of the cross-head type. This modification of the apparatus is identical with that illustrated in Fig. 1 except for the structure of the die, the core tube holder and the core tube.

A stock screw 110 advances a plastic compound 114 through a tapered passageway 120 to a chamber 122. The apparatus shown in Fig. 4 has a die 124 mounted at the left hand end of the chamber 122, which die more nearly resembles conventional dies than does the die 24. Its central aperture 130 may be cylindrical in shape or it may be conical. It may diminish gradually in cross-section from the entrance end to the exist end of the die, or it may have a conical entrance end 135 while the rest of the aperture is cylindrical. When the entrance end 135 of the aperture is formed with a large conical angle while the rest of the aperture either is formed with a small conical angle or is formed cylindrical, the large conical angle of the entrance 135 may match the configuration of a frustoconical tip 137 formed on the outer end of a cylindrical core tube 128. The frustoconical tip 137 may be described as being cut from a cone having an apex angle which may range from about 15° up to about 60°. The frustoconical tip 137 and the conical entrance 135 are closely spaced and form a conical passageway between them. A core tube holder 126 terminates in a transversely flat face 138 forming a base for a cylindrical plug 140 formed on the left-hand end of the core tube holder. The plug 140 is provided with longitudinal grooves 142—142 leading into radial grooves 144—144 which converge upon the core tube 128 where it protrudes from the end of the core tube holder. Unlike the conical portion 56 on the core tube holder 26 shown in Fig. 1, a beveled portion 156 of the core tube holder 126 is not perfectly conical. Instead, the beveled portion 156 resembles a pair of identical helical sections formed on opposite halves of the core tube holder surface. These helical sections begin at a point near the exit end of the tapered passageway 120, and they end by blending together at a point which lies on the opposite side of the core tube holder 126 but closer to the left-hand end of the core tube holder than does the point at which the helical sections begin.

This arrangement of the beveled section 156 of the core tube holder 126 results in cutting away a portion of the cylindrical plug 140 on the side of the core tube holder the furthest away from the stock screw 110. On the side of the cylindrical plug 140 that is cut away, the longitudinal grooves 142—142 are shorter than are the corresponding grooves on the opposite side of the plug. In addition, the unoccupied portion of the chamber 122 is larger in the zone in which the plug is cut away. In consequence, considerably less resistance is presented to the flow of the plastic compound 114 on that side of the core tube holder 126 than on the side nearer to the stock screw 110.

In order to advance from the stock screw 110 through the die 124, the plastic compound must travel a longer path on the side of the cylindrical plug 140 that is cut away than the path along the opposite side of the plug. Normally the resistance to the flow of the compound would be greater in the longer path, but by cutting away a portion of the plug 140, the resistance in the longer path is reduced so that the rate of flow of the plastic compound becomes nearly equalized by the time the compound converges upon the core tube through the radial grooves 144—144. This modification of the apparatus is effective to compensate for unbalanced flow conditions normally found in extruders of the cross-head type. It may be used to perform methods of extruding cellular plastics upon conductors identical with the methods described in detail in the foregoing paragraphs.

*2nd modification*

Figure 2:
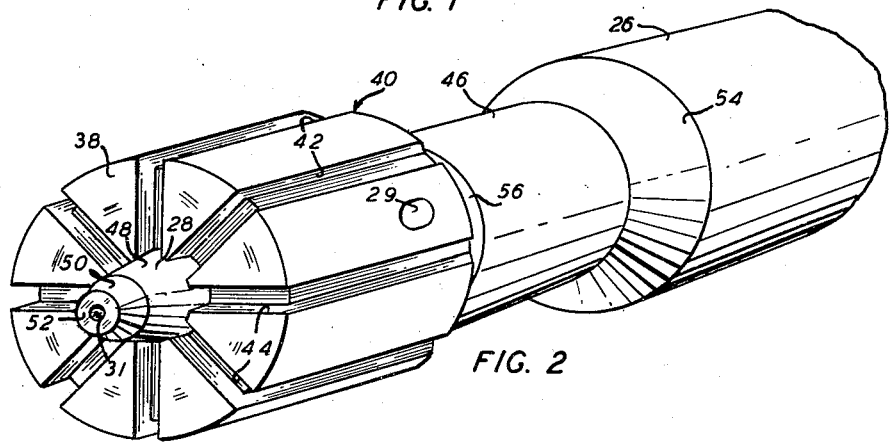
Fig. 2 is an enlarged perspective view of a portion of the apparatus shown in Fig. 1.
Figure 6:
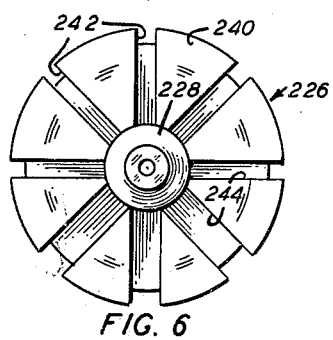
Fig. 6 is an end view of a modification of the portion of the apparatus shown in Fig. 2.

Fig. 6 illustrates a second modification of the portion of the apparatus shown in Fig. 2, which is designed to accomplish results equivalent to those obtainable by the use of the modification shown in Figs. 4 and 5.

In this modification, a core tube holder 226 having a core tube 228 mounted therein is provided with a plurality of longitudinal grooves 242—242 and a plurality of radial grooves 244—244 equally spaced circumferentially thereof. On one side of this core tube holder, both the longitudinal and the radial grooves have a larger cross-section than do the grooves on the opposite side thereof. When this core tube holder is fitted into the extruder illustrated in Fig. 1, the core tube holder 226 is oriented so that the side having the larger grooves is more distant from the stock screw than the side having the smaller grooves. Consequently, the portion of the plastic compound that travels the longest path in advancing from the stock screw through the die moves through a quadrant of the chamber of the head having a plurality of passageways of larger cross-sectional area than the passageways in the other quadrants of the chamber.

The passageways of larger cross-sectional area must be on the side of the core tube that is opposite the side on which the stock screw is mounted. Ordinarily the rate of flow of the plastic compound would be lowest in the area most distant from the stock screw, but by enlarging the cross-sectional area of the passageways through this quadrant, the rate of flow in this quadrant is raised. This arrangement may be used to equalize the rates of flow existing in the plastic compound circumferentially of the tip of the core tube. This modification of the apparatus is most effective to correct any lack of concentricity that may occur between the core and the extruded sheath of an insulated conductor. No change need be made in the methods described above when this modification of the apparatus is used to carry out such methods.

In the expanded polyethylene sheath the percentage of occluded gas may vary from about 25% up to about 75% by volume. A value of approximately 50% by volume of gas is considered very desirable. When this percentage of gas is trapped within a multiplicity of minute, uniformly distributed cells in the extruded sheath, the dielectric constant of the cellular insulation has a value of about 1.63, in comparison with a value of 2.26 for insulation composed of solid polyethylene. The preferred gas content is about 58%, for which the value of the dielectric constant is 1.53.

A polyethylene compound prepared for extrusion may contain about 3% by weight of blowing agent, when the blowing agent is dinitroso pentamethylene tetramine and when the expanded insulation produced contains about 50% by volume of occluded gas. The amount of blowing agent incorporated may be increased up to about 7% by weight, when it is desired to produce a sheath having a larger percentage of gas therein. Smaller amounts of the blowing agent may be used, if desired.

Other blowing agents, such as diazoamino benzene, may be substituted for the dinitroso pentamethylene tetramine specified in the foregoing description.

What is claimed is:

1. An apparatus for extruding onto a moving core a plastic compound containing a blowing agent which expands the extruded compound into a cellular form, which comprises an extrusion head having a chamber therein, an extrusion die mounted at one end of the chamber, a core tube holder mounted in the chamber, a core tube mounted in the holder in axial alignment with and spaced closely from the die, said holder having a cylindrical end terminating in a transversely flat face, the cylindrical end being provided on its periphery with a plurality of small, longitudinal grooves, said flat face being provided with a plurality of small, radial grooves which communicate with the longitudinal grooves and are directed radially towards a core being advanced through the core tube, said flat face abutting the die so that the holder completely occupies the portion of the chamber adjacent to the die except for the passageways provided by the grooves, thereby splitting the flowing plastic compound into a plurality of elongated restricted streams which are sufficiently small to create a back pressure within the chamber sufficient to prevent the agent from expanding the compound until it issues from the die, and means for forcing such a plastic compound through the chamber, the grooves, and the die.

2. An apparatus for extruding onto a filamentary conductive core an insulating sheath composed of a plastic compound containing a blowing agent which expands the extruded compound into a cellular form, which comprises an extrusion head having a chamber therein, an extrusion die mounted at one end of the chamber, said die having a central orifice provided with identical bellmouthed entrance and exit portions on opposite sides thereof, a core tube holder mounted in the chamber, a core tube mounted in the holder in axial alignment with and projecting into the bellmouthed entrance portion of the die orifice for guiding an advancing core toward the die, said holder having a cylindrical end terminating in a transversely flat face, the cylindrical end being provided on its periphery with a plurality of small longitudinal grooves, said transversely flat face being provided with a plurality of small radial grooves which communicate with the longitudinal grooves and said flat face abutting the die so that the cylindrical end of the holder completely occupies the portion of the chamber adjacent to the die except for the passageways provided by the grooves, thereby splitting the flow of the plastic compound into a plurality of elongated restricted streams which are sufficiently small to create a back pressure within the chamber sufficient to prevent the agent from expanding the compound until it issues from the die, and means for forcing such a plastic compound through the chamber, the grooves, and the die.

3. An apparatus for extruding onto a filamentary conductive core an insulating sheath composed of a plastic compound containing a blowing agent which expands the extruded compound into a cellular form, which comprises an extrusion head having a chamber therein, an extrusion die mounted at one end of the chamber, said die being cylindrical and having a central orifice bounded by a wall semicircular in cross-section forming identical bellmouthed entrance and exit portions, a cylindrical core tube holder mounted in the chamber, said holder having a cylindrical end terminating in a transversely flat face abutting the die and having a central portion reduced in size circumferentially thereof, said cylindrical end of the holder being provided with a plurality of small longitudinal grooves equally spaced circumferentially thereof, said flat face being provided with a plurality of small radial grooves which communicate with the longitudinal grooves so that the holder completely occupies the portion of the chamber adjacent to the die except for the passageways provided by the grooves, thereby splitting the flow of the plastic compound into a plurality of elongated restricted streams which are sufficiently small to create a back pressure within the chamber sufficient to prevent the agent from expanding the compound until it issues from the die, a core tube mounted in the holder in axial alignment with and projecting into the bellmouthed entrance portion of the die orifice for guiding and advancing core toward the die, said core tube having a conical tip which projects from the holder in the center of the radial grooves on the flat face of the holder, and means for forcing such a plastic compound through the chamber, the grooves, and the die.

4. An apparatus for forming an insulating sheath composed of a cellular polyethylene onto a filamentary conductive core, which comprises a stock screw rotatably mounted within a cylindrical bore for advancing a plastic compound consisting essentially of polyethylene containing a blowing agent, an extrusion head having a chamber therein mounted transversely across the delivery end of the bore for receiving the plastic advanced by the stock screw, an extrusion die mounted at one end of the chamber, a cylindrical core tube holder mounted in the chamber, said holder having a cylindrical end terminating in a transversely flat face abutting the die and having a central portion reduced in size circumferentially thereof, said central portion being positioned adjacent to the delivery end of the extrusion bore, said cylindrical end of the holder being provided with a plurality of small longitudinal grooves equally spaced circumferentially thereof, said flat face being provided with a plurality of small radial grooves which communicate with the longitudinal grooves so that the holder completely occupies the portion of the chamber adjacent to the die except for the passageways provided by the grooves, thereby splitting the flow of the plastic compound into a plurality of elongated restricted streams which are sufficiently small to create a back pressure within the chamber sufficient to prevent the agent from expanding the compound until it issues from the die, a portion of the cylindrical end of the holder on the side opposite the stock screw being cut away forming a pair of helical surfaces which extend from the reduced central portion of the core tube holder to the opposite side of the holder at a point nearer to the transversely flat face thereof, thereby enlarging the chamber on the side more distant from the stock screw, and a core tube mounted in the holder in axial alignment with and projecting into the die for guiding an advancing core toward the die, said core tube having a conical tip which projects from the holder in the center of the radial grooves on its flat face.

5. An apparatus for forming an insulating sheath composed of a cellular plastic onto a filamentary conductive core, which comprises a stock screw rotatably mounted within a cylindrical bore for advancing a plastic compound containing a blowing agent, an extrusion head having a chamber therein mounted transversely across the delivery end of the bore for receiving the plastic advanced by the stock screw, an extrusion die mounted at one end of the chamber, a core tube holder mounted in the chamber, and a core tube mounted in the holder in axial alignment with and spaced closely from the die for guiding an advancing core toward the die, said holder having a cylindrical end terminating in a transversely flat face, the cylindrical end being provided on its periphery with a plurality of small, longitudinal grooves, said flat face being provided with a plurality of small, radial grooves which communicate with the longitudinal grooves and said flat face abutting the die so that the holder completely occupies the portion of the chamber adjacent to the die except for the passageways provided by the grooves, thereby splitting the flow of the plastic compound into a plurality of elongated restricted streams which are sufficiently small to create a back pressure within the chamber sufficient to prevent the agent from expanding the compound until it issues from the die, the grooves on the side away from the stock screw being larger than the grooves on the opposite side, thereby compensating for an unbalance of pressure created by the transverse mounting of the extrusion head.

6. An apparatus for forming an insulating sheath composed of a cellular polyethylene onto a filamentary conductive core, which comprises a stock screw rotatably mounted within a cylindrical bore for advancing a plastic compound consisting essentially of polyethylene containing a blowing agent, an extrusion head having a chamber therein mounted transversely across the delivery end of the bore for receiving the plastic advanced by the stock screw, an extrusion die mounted at one end of the chamber, a cylindrical core tube holder mounted in the chamber, said holder having a cylindrical end terminating in a transversely flat face abutting the die and having a central portion reduced in size circumferentially thereof, said cylindrical end of the holder being provided with a plurality of small longitudinal grooves equally spaced circumferentially thereof, said flat face being provided with a plurality of small radial grooves which communicate with the longitudinal grooves so that the holder completely occupies the portion of the chamber adjacent to the die except for the passageways provided by the grooves, thereby splitting the flow of the plastic compound into a plurality of elongated restricted streams which are sufficiently small to create a back pressure within the chamber sufficient to prevent the agent from expanding the compound until it issues from the die, and a core tube mounted in the holder in axial alignment with and projecting into the entrance portion of the die orifice for guiding an advancing core toward the die, said core tube having a conical tip which projects from the holder in the center of the radial grooves on the flat face of the holder.

7. The method of extruding a covering of cellular, plastic insulation onto a filamentary conductor, which comprises advancing such a conductor axially through an extrusion die, forcing a mixture of a heat decomposable blowing agent and a plastic compound through the die around the advancing conductor to produce a concentric sheath on the conductor, heating the mixture sufficiently to cause the blowing agent to decompose and generate a gas, splitting the flowing mixture into a plurality of streams which are radially directed towards the advancing conductor just before the conductor reaches the die, and restricting the flow of the streams sufficiently to create a back pressure in the flowing mixture of sufficient magnitude to force the gas to dissolve in the plastic compound and to remain dissolved therein while the mixture is in the extrusion die, thereby preventing premature expansion thereof before it emerges from the die.

8. The method of extruding a covering of cellular, plastic insulation onto a filamentary conductor, which comprises advancing such a conductor axially through an extrusion die, forcing a mixture of polyethylene and a heat decomposable blowing agent through the die around the advancing conductor to produce a concentric sheath on the conductor, heating the mixture sufficiently to cause the agent to decompose and generate a gas, splitting the flowing mixture into a plurality of thin streams equally spaced circumferentially of and flowing parallel to the advancing conductor, then directing the thin streams radially towards the advancing conductor just before the conductor reaches the die, and restricting the flow of the streams sufficiently to create a back pressure of sufficient magnitude to force the gas to dissolve in the flowing plastic compound and to remain dissolved therein while the mixture is in the die, thereby preventing premature expansion thereof before it emerges from the die.

9. An apparatus for extruding an insulating sheath composed of a cellular polyethylene onto a filamentary conductive core, which comprises a stock screw for advancing a plastic compound consisting essentially of polyethylene containing a blowing agent, an extrusion head having a chamber therein mounted transversely across the delivery end of the bore, an extrusion die mounted at one end of the chamber, a core tube holder mounted in the chamber, and a core tube mounted in the holder in axial alignment with the die for guiding an advancing core into the die, said holder having an enlarged cylindrical end which completely occupies the portion of the chamber adjacent to the die and terminates in a transversely flat face in abutting contact with the die, said cylindrical end being provided with at least eight longitudinal grooves spaced equally around the periphery thereof and extending the entire length thereof, each of said grooves having a length of about ½ inch and having a maximum cross-sectional area equivalent to a semicircle having a radius of about 3/64 inch, whereby the plastic compound flows through the grooves in at least eight streams which are restricted sufficiently to create a back pressure of the order of 6,000 pounds per square inch within the chamber to prevent the blowing agent from expanding the plastic compound until it issues from the die.

10. An apparatus for extruding an insulating sheath composed of a cellular polyethylene onto a filamentary conductive core, which comprises a stock screw for advancing a plastic compound consisting essentially of polyethylene containing a blowing agent, an extrusion head having a chamber therein mounted transversely across the delivery end of the bore, an extrusion die mounted at one end of the chamber, a core tube holder mounted in the end of the chamber, and a core tube mounted in the holder in axial chamber, and a core tube mounted in the holder in axial alignment with the die for guiding an advancing core into the die, said holder having an enlarged cylindrical end which completely occupies the portion of the chamber adjacent to the die and terminates in a transversely flat face in abutting contact with the die, said cylindrical end being provided on its periphery with at least eight longitudinal grooves and said transversely flat face being provided with an equal number of radial grooves which communicate with the longitudinal grooves and extend to the core tube so that the plastic compound flows through the grooves in at least eight restricted streams which converge upon a core being advanced through the core tube, each of said streams having a length of more than ½ inch and having a maximum cross-sectional area equivalent to a semicircle having a radius of about 3/64 inch, whereby the streams flowing through the grooves are restricted sufficiently to create a back pressure of the order of 6,000 pounds per square inch within the chamber to prevent the blowing agent from expanding the plastic compound until it issues from the die.

11. An apparatus for extruding upon a constantly moving, continuous conductor a covering of a plastic compound containing a blowing agent which expands the extruded covering into a cellular form, which comprises an extrusion head having a cylindrical chamber therein, an extrusion die mounted at one end of the chamber, a core guide mounted at the other end of the chamber and having an enlarged cylindrical end forming a plug which fills the portion of the chamber adjacent to the die, the periphery and the end of the plug nearer to the die being provided with a plurality of shallow grooves extending first longitudinally along and then continuing radially inwardly of the plug to provide the only paths of flow for the plastic from the chamber to the die, and means for forcing such a plastic compound through the chamber, the grooves and the die, said grooves being of such length and such restricted cross-section that the frictional resistance offered thereby to the flow of plastic compound therethrough creates a back pressure in the chamber sufficient to prevent the blowing agent from expanding the compound until it emerges from the die.

12. An apparatus for extruding upon a moving, continuous conductor a covering of a plastic compound containing a blowing agent which expands the extruded compound into a cellular form, which comprises an extrusion head having a cylindrical chamber therein, a cylindrical extrusion die mounted at one end of the chamber, a core tube holder mounted at the opposite end of the chamber, a core tube mounted in the holder adjacent to and in axial alignment with the die, said holder having a cylindrical end forming a plug which fills the chamber adjacent to and abuts the die, the periphery of the plug being provided with a plurality of shallow, longitudinal grooves leading to a plurality of small radial grooves formed on the end of the plug abutting the die which grooves provide the only paths through which plastic compound may flow from the chamber to the die, and means for forcing such a plastic compound through the chamber, the grooves and the die, said grooves being of such length and such restricted cross-section that the frictional resistance offered thereby to the flow of plastic compound therethrough creates a back pressure in the chamber sufficient to prevent the blowing agent from expanding the compound until it emerges from the die.

References Cited in the file of this patent

UNITED STATES PATENTS

| | | |
|---|---|---|
| 1,586,737 | Geyer | June 1, 1926 |
| 1,862,947 | Smith et al. | June 14, 1932 |
| 2,199,209 | Safford | Apr. 30, 1940 |
| 2,308,638 | Balthis et al. | Jan. 19, 1943 |
| 2,332,538 | Smith | Oct. 26, 1943 |
| 2,444,831 | Kilborn | July 6, 1948 |
| 2,500,401 | Cossette | Mar. 14, 1950 |
| 2,560,778 | Richardson et al. | July 17, 1951 |
| 2,566,846 | Martin | Sept. 4, 1951 |
| 2,573,440 | Henning | Oct. 30, 1951 |